Feb. 25, 1930.                M. O. SNEDIKER                1,748,369
                                HEAT REGULATOR
                              Filed Oct. 3, 1928
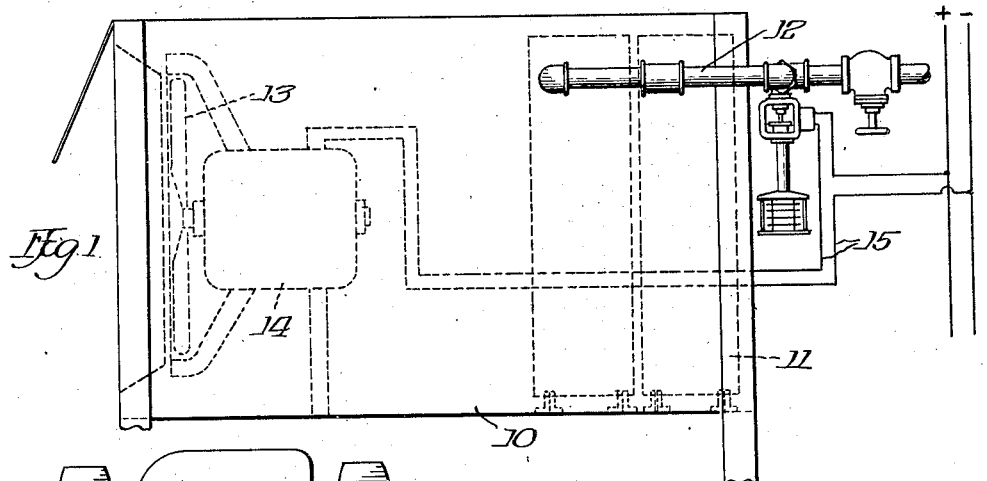
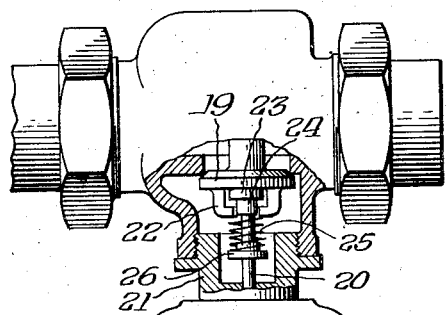
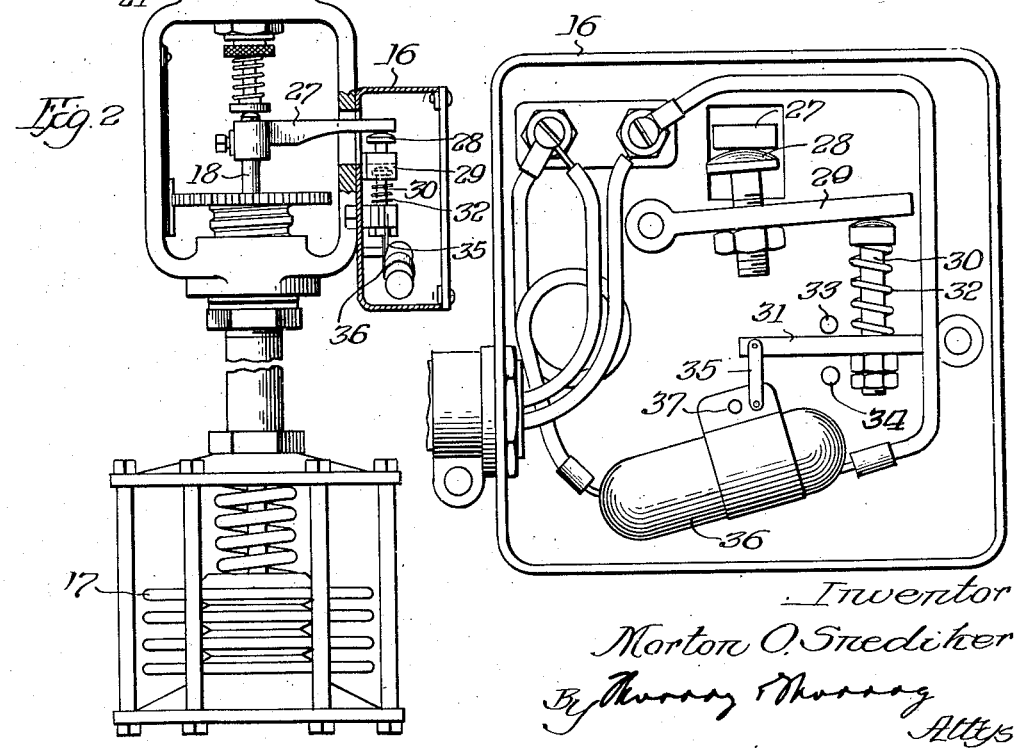
Inventor
Morton O. Snediker
By Murray & Murray
Attys Patented Feb. 25, 1930

1,748,369

UNITED STATES PATENT OFFICE

MORTON O. SNEDIKER, OF CHICAGO, ILLINOIS, ASSIGNOR TO POWERS REGULATOR COMPANY, OF CHICAGO, ILLINOIS, A CORPORATION OF ILLINOIS

HEAT REGULATOR

Application filed October 3, 1928. Serial No. 310,102.

My inevntion relates to heat controlling devices and particularly to an improvement on the controlling mechanism for so-called heat units, in which a heat exchange device, such as a radiator, is used in association with a fan or blower for directing air over said radiator.

While devices of this general character are in common use, an objection thereto is that the fan or air circulating device is constantly operating unless manually turned on and shut off. This involves a waste of power as there is no occasion for circulation of air when heat is shut off from the radiator. However, any fan-controlled device operating in unison with the shut-off valve for the heat is inadequate and unsatisfactory for the reason that the fan should run for an appreciable period following the shut off of the heat to the radiator in order to dissipate the heat already supplied to the radiator. This result is accomplished in the mechanism herein described.

The invention will be more readily understood by reference to the accompanying drawings, in which Fig. 1 is a view somewhat diagrammatic in form, showing a device constructed in accordance with my invention;

Fig. 2 is an enlarged elevation partly in section showing the means for controlling the heat supply valve and the motor switch, and Fig. 3 is a front elevation of the switch.

In the drawings, I have illustrated a heat cabinet 10, having a radiator 11 therein, to which steam is supplied through the pipe 12. A fan is indicated at 13, a motor at 14, wires at 15 from the motor to a switch box 16, the details of which will be later described.

A thermostat is shown comprising a bellows 17 which serves to actuate a stem 18. A balanced shut-off valve is shown at 19 and a valve stem 20 projects through a bonnet 21 acting as an extension of the thermostat stem 18. A socket 22 is provided on the lower end of the valve 19 and a head 23 on the stem 20 enters the socket with capacity for lost motion to the extent of the space 24. A coil spring 25 extends between the valve socket and an annular collar 26 on the stem 20, and holds the valve in the seated position shown in Fig. 2.

An arm 27 is rigidly fixed to the thermostat stem 18 and projects through the back wall of the switch casing 16, overlying the rounded head 28 of a bolt that is fixed in an oscillating arm 29. The free end of the arm 29 overlies the head of a bolt 30 that extends through a second arm 31 and is held in operating position by means of the coil spring 32. The arm 31 is limited in its oscillation by the pins 33—34.

A link 35 connects the free end of the arm 31 to a mercury switch bulb 36 which is pivoted at 37.

With the parts in position shown in the drawings, the steam is shut off by the valve 19 and the fan is idle. However, assuming that the temperature of the space containing the thermostat has lowered and the thermostat stem has begun a downward movement, continued downward movement will cause corresponding movement of the arms 27, 29 and 31 and the rocking of the mercury switch 36, sufficient to make contact and start the motor fan. Further movement of the thermostat will cause downward movement of the valve 19 and permit the entrance of the steam to the radiator.

When the temperature of the space has reached a predetermined point, the thermostat will move the stem upwardly and close the valve 19 but the motor fan will not be shut off until the stem has moved upwardly to the extent of the lost motion 24 in the socket. Thus the fan will continue to operate for an appreciable period after the supply of steam has been interrupted. After the arm has moved to the position of Fig. 2, the weight of mercury in the bulb will cause the bulb to rock into the position shown, and the contact broken. Thus the operation is automatic and the fan will be connected and disconnected as required without attention or manual operation.

In some cases the position of the fan and radiator will be the reverse of that shown in the drawings, but in any case the thermostat will be located in a position to be subject to the temperature of the incoming air. In other cases, the thermostat may be located at a more distant point, the control of the valve and motor switch being through the medium of compressed air or otherwise.

These and other modifications are considered to be within the scope of my invention.

I claim:

1. In combination, a heat exchange element, a motor driven fan for moving air over said element, a heat valve controlling thermostat in the space surrounding said element, a stem controlled by said thermostat, means providing lost motion between the stem and valve, a motor switch, and means actuated by said stem for moving said switch to start and stop the fan as heat is to be supplied or reduced.

2. In combination, a heat exchange element, a motor driven fan for moving air over said element, a heat valve controlling thermostat in the space surrounding said element, a stem controlled by said thermostat, a motor switch, means on said stem for moving the switch to start and stop the motor fan, and means operative when said valve is closed for starting the motor preceding the opening of said valve.

3. In combination, a heat exchange element, a motor driven fan for moving air over said element, a heat valve controlling thermostat in the space surrounding said element, a stem controlled by said thermostat, a motor switch, means on said stem for moving the switch to start and stop the motor fan, and means operative when said valve is closed for starting the motor preceding the opening of said valve, and means for effecting a continuance of motor operation for a period after said valve is fully closed.

4. In combination, a radiator, a motor driven fan for moving air over said radiator, a thermostat for controlling the supply of heat to said radiator, said thermostat being located in the space through which the supply of air is moved toward the radiator, a switch for the motor fan, means permitting a continuance of motor operation for a period after said valve is fully closed, and means operated by the thermostat for then shutting off the motor.

5. In combination, a radiator, a motor driven fan for moving air over said radiator, a thermostat for controlling the supply of heat to said radiator, said thermostat being located in the space through which the supply if air is drawn to the radiator, a switch for the motor fan, and means operated by the thermostat for actuating said switch to effect starting of the motor before the valve is opened.

6. In combination, a radiator, a motor driven fan for moving air over said radiator, a thermostat for controlling the supply of heat to said radiator, said thermostat being located in the space through which the supply of air is moved toward the radiator, said thermostat having a valve operating stem, a lateral arm fixed to the stem, and a motor switch operated by said arm.

7. In combination, a heat exchange element, a motor driven fan for moving air over said element, a heat valve controlling thermostat in the space surrounding said element, a stem connected to said valve and controlled by said thermostat, a motor switch and means on said stem for moving the switch to start and stop the motor fan.

In testimony whereof I have affixed my signature.

MORTON O. SNEDIKER.